(12) United States Patent
Balachandran et al.

(10) Patent No.: US 9,870,213 B2
(45) Date of Patent: Jan. 16, 2018

(54) UNIFIED CONSUMPTION EXPERIENCE FOR SOFTWARE INSTALLATION

(71) Applicant: SAP SE, Walldorf (DE)

(72) Inventors: Biju Balachandran, Bangalore (IN); Niraj Kumar, Bangalore (IN)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 14/857,446

(22) Filed: Sep. 17, 2015

(65) Prior Publication Data

US 2017/0039052 A1    Feb. 9, 2017

(30) Foreign Application Priority Data

Aug. 6, 2015  (IN) .......................... 4105/CHE/2015

(51) Int. Cl.
- G06F 9/45 (2006.01)
- G06F 9/445 (2006.01)
- G06F 9/44 (2006.01)

(52) U.S. Cl.
CPC . G06F 8/61 (2013.01); G06F 8/70 (2013.01)

(58) Field of Classification Search
CPC ..................................... G06F 8/61; G06F 8/70
See application file for complete search history.

(56) References Cited

U.S. PATENT DOCUMENTS

| | | | |
|---|---|---|---|
| 6,110,228 A * | 8/2000 | Albright | G06F 8/68 707/999.2 |
| 6,282,709 B1 | 8/2001 | Reha | |
| 6,301,707 B1 * | 10/2001 | Carroll | G06F 8/61 717/177 |
| 7,003,534 B2 | 2/2006 | Peng et al. | |
| 7,096,464 B1 | 8/2006 | Weinmann et al. | |
| 7,533,380 B2 | 5/2009 | Neuer et al. | |
| 8,176,483 B2 | 5/2012 | Hoefler et al. | |
| 8,180,909 B2 * | 5/2012 | Hartman | G06F 8/61 709/226 |
| 8,200,787 B2 | 6/2012 | Schulz et al. | |
| 8,413,165 B2 * | 4/2013 | Lindemann | G06Q 30/06 717/100 |
| 8,464,246 B2 | 6/2013 | Davies et al. | |
| 8,612,961 B2 | 12/2013 | Stewart | |
| 8,792,934 B2 * | 7/2014 | Cupala | G06F 8/65 455/550.1 |

(Continued)

OTHER PUBLICATIONS

Huilin Yuan et al., "The Application of Module in Logistics Management Information System (LSMIS)", [Online], 2005, 830-832, [Retrieved from Internet on Oct. 27, 2017], <http://delivery.acm.org/10.1145/1090000/1089712/p830-yuan.pdf>.*

(Continued)

*Primary Examiner* — Ziaul A Chowdhury
(74) *Attorney, Agent, or Firm* — Brake Hughes Bellermann LLP

(57) ABSTRACT

A maintenance planner receives an installation request for installation of a software product and associated update on a client system, and provides a media download for installing the software product and associated update, along with an installation file characterizing both the software product and a delta file. The delta file describes differences between the software product, the associated update, and any additional update used to satisfy the installation request.

19 Claims, 6 Drawing Sheets

(56) References Cited

U.S. PATENT DOCUMENTS

| | | | |
|---|---|---|---|
| 9,213,538 B1* | 12/2015 | Ladd | G06F 8/70 |
| 9,785,928 B1* | 10/2017 | Brandwine | G06F 8/61 |
| 2002/0010910 A1* | 1/2002 | Crudele | G06F 8/61 |
| | | | 717/128 |
| 2002/0066010 A1* | 5/2002 | Bourke-Dunphy | G06F 8/61 |
| | | | 713/100 |
| 2005/0262501 A1* | 11/2005 | Marinelli | G06F 8/61 |
| | | | 717/174 |
| 2007/0106695 A1* | 5/2007 | Miyazawa | G06F 8/70 |
| 2007/0157192 A1* | 7/2007 | Hoefler | G06F 8/65 |
| | | | 717/168 |
| 2008/0201705 A1* | 8/2008 | Wookey | G06F 8/68 |
| | | | 717/175 |
| 2009/0112735 A1* | 4/2009 | Viehmann | G06Q 30/0601 |
| | | | 705/26.1 |
| 2009/0245236 A1* | 10/2009 | Scott | H04L 45/02 |
| | | | 370/352 |
| 2009/0260004 A1* | 10/2009 | Datta | G06F 8/65 |
| | | | 717/175 |
| 2010/0162227 A1* | 6/2010 | Davies | G06F 8/61 |
| | | | 717/173 |
| 2010/0169875 A1* | 7/2010 | Stewart | G06F 8/65 |
| | | | 717/170 |
| 2011/0113424 A1 | 5/2011 | Ewington et al. | |
| 2012/0124565 A1* | 5/2012 | Salle | G06F 8/34 |
| | | | 717/162 |
| 2012/0331454 A1 | 12/2012 | Cross | |
| 2014/0173587 A1* | 6/2014 | Balachandran | G06F 8/60 |
| | | | 717/173 |
| 2014/0173588 A1* | 6/2014 | Ko | G06F 8/68 |
| | | | 717/173 |
| 2014/0196020 A1 | 7/2014 | Shetty et al. | |
| 2014/0316926 A1* | 10/2014 | Gounares | G06Q 30/0611 |
| | | | 705/26.4 |
| 2014/0380265 A1* | 12/2014 | Driesen | G06F 8/70 |
| | | | 717/101 |
| 2015/0089473 A1* | 3/2015 | Gocek | G06F 8/70 |
| | | | 717/120 |
| 2016/0011730 A1* | 1/2016 | Rajasekar | H04L 41/22 |
| | | | 715/735 |

OTHER PUBLICATIONS

Christopher Pietsch et al., "A Tool Environment for Quality Assurance of Delta-oriented Model-based SPLs", [Online], 2017, pp. 1-8, [Retrieved fron Internet on Oct. 27, 2017], <http://delivery.acm.org/10.1145/3030000/3023960/p84-pietsch.pdf>.*

SAP, "SAP NetWeaver™ '04 Support Package Stack 15 and higher", Support Package Stack Guide, Jan. 9, 2005, 87 pages.

* cited by examiner

UNIFIED CONSUMPTION EXPERIENCE FOR SOFTWARE INSTALLATION

CROSS-REFERENCE TO RELATED APPLICATION

This application claims priority under 35 U.S.C. §119 to Indian Patent Application No. 4105/CHE/2015, filed on Aug. 6, 2015, which is incorporated herein by reference in its entirety.

TECHNICAL FIELD

This description relates to software installation.

BACKGROUND

Many businesses and other users rely on one or more software systems, typically provided by external software vendors, to execute various required or desired operations. Such software systems are often large (e.g., in terms of operations performed, functional modules included, and/or data consumed), dynamic, and highly specialized. For example, a business may wish to use business software designed to facilitate enterprise resource planning (ERP), supply chain management (SCM), human resources (HR), customer relationship management (CRM), or other business-related operations.

Thus, for example, any given software system may be associated with different versions or updates, different tools/processes (e.g., for executing an installation or update of the software), or different languages, and many of these may change over time, and/or may vary in terms of what is required by a given business at a specific time. Moreover, the business may wish to use multiple ones of such software systems, perhaps from different vendors. As a result, the businesses (e.g., an Information Technology (IT) administrator(s) employed by the business) may find it difficult, time-consuming, and error-prone to use and benefit from available software systems.

SUMMARY

According to one general aspect, a system includes instructions recorded on a non-transitory computer-readable storage medium, and executable by at least one processor. The system includes a maintenance planner configured to cause the at least one processor to receive an installation request for installation of a software product and associated update on a client system, and further configured to cause the at least one processor to provide a media download for installing the software product and associated update along with an installation file characterizing both the software product and a delta file, the delta file describing differences between the software product, the associated update, and any additional update used to satisfy the installation request. The maintenance planner includes an installation request handler configured to receive the installation request and parse the installation request to identify the software product, the associated update, and any other installation data included therein, and a repository query generator configured to query a software logistics process repository mapping software products to corresponding installation data, to thereby obtain query results based on the installation data included in the installation request. The maintenance planner also includes a delta calculator configured to calculate the delta file, based on the installation request and the query results, and an installation file generator configured to generate the installation file, based on the installation request, the delta file, and the query results.

According to another general aspect, a computer-implemented method for executing instructions stored on a non-transitory computer readable storage medium includes receiving an installation request from a client system, specifying a software product and associated update to be installed on the client system, and querying a software logistics process repository mapping software products to corresponding installation data, the installation data including at least updates for corresponding ones of the software products and at least one software logistics tool for executing software installations. The method also includes calculating a delta file from the requested software product and any requested update, the delta file characterizing differences between the software product and the requested installation, based on query results of the querying of the software logistics process repository, retrieving a media download containing the requested software product and the delta file for the requested installation, and providing the media download to the client system for installation thereon.

According to another general aspect, a computer program product is tangibly embodied on a non-transitory computer-readable storage medium and comprises instructions. The instructions, when executed, are configured to cause at least one computing device to receive an installation request from a client system, specifying a software product and associated update to be installed on the client system, and query a software logistics process repository mapping software products to associated installation data, the installation data including at least updates for corresponding ones of the software products and at least one software logistics tool for executing software installations. The instructions, when executed, are further configured to calculate a delta file from the requested software product and any requested update, the delta file characterizing differences between the software product and the requested installation, based on query results of the querying of the software logistics process repository. The instructions, when executed, are further configured to retrieve a media download containing the requested software product and the delta file for the requested installation, and provide the media download to the client system for installation thereon.

The details of one or more implementations are set forth in the accompanying drawings and the description below. Other features will be apparent from the description and drawings, and from the claims.

DETAILED DESCRIPTION

Figure 1:
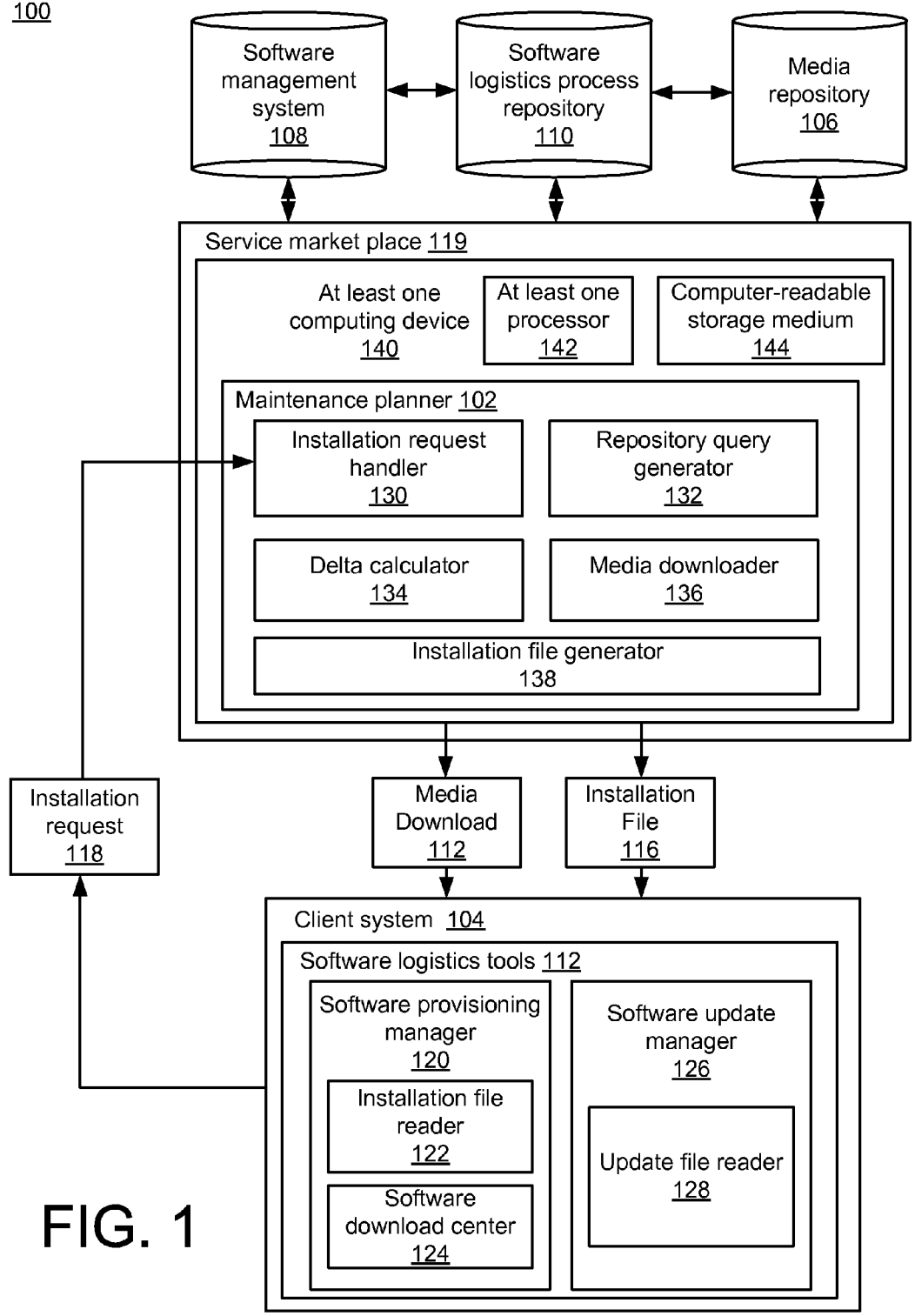
FIG. 1 is a block diagram of a system for a unified consumption experience for software installation.

FIG. 1 is a block diagram of a system 100 for a unified consumption experience for software installation. In the example of FIG. 1, a maintenance planner 102 interacts with a client system 104 to mediate between the client system 104 and software system(s) available from a media repository 106, for the purpose, e.g., of installing desired software that is provided and managed by an external software vendor (not shown in FIG. 1) through the use of a software management system 108.

More specifically, as described in detail below, a software logistics process repository (SLPR) 110 is utilized that provides necessary installation data in a unified, machine-readable manner, where the installation data includes information related to completing a unified consumption or installation of desired software (e.g., a software product), including any desired updates associated with the software but not currently included in the download thereof. The installation data includes a specification of one or more software logistics tools 112 that may be available at (or obtainable by) the client system 104 to assist in the installation process.

Consequently, a user of the client system 104 is provided with a customized, unified consumption experience when installing desired software, without requiring extensive knowledge or effort by the user, even when the desired software is associated with multiple versions, updates, languages, or other specializations. In particular, as illustrated in FIG. 1, the client system 104 may be provided with a media download 114 representing a customized version of desired software, along with an installation file 116 that provides the client system 104 with required information for obtaining and/or installing the media download 114.

In order to initiate the desired installation, the client system 104 may be used to send an installation request 118 to the maintenance planner 102. As described in detail below, the installation request 118 may be provided by the client system 104 during an interaction with a service market place 119 designed to provide access to desired types of software (e.g., software stored in the media repository 106 and managed using the software management system 108), in conjunction with the maintenance planner 102.

Further, the installation request 104 may include information provided by the client system 104 characterizing the desired installation. As described below, the maintenance planner 102 may thus query the SLPR 110 based on the installation request 118 to identify the requested software and various other installation data (including, e.g., relevant updates and any client-available software logistics tools 112) and other relevant metadata, and thereby identify, retrieve, and provide the media download 114 and the installation file 116.

As described herein, the SLPR is easily accessible to the maintenance planner 102 (e.g., stores the mapping and related data in machine-readable format with appropriate interfaces for interacting with the maintenance planner 102), and provides a mapping of such installation parameters and other relevant metadata to related data and metadata within the media repository 106 and the software management system 108. Accordingly, the client system 104 may obtain all relevant installation data for installing a complete and fully updated software system, based on the installation request 118.

In the example of FIG. 1, the service marketplace (SMP) 119 may be designed to provide a website or other network location that serves as a common forum for customers or other users to identify, purchase, and download desired software. More specifically, as described in more detail herein, the SMP 119 may provide such a forum for some or all of the software products referenced within the software management system 108.

As also described in detail herein, the various software products referenced in the software management system 108 may include, or be associated with, one or more software updates that were not included in the software product as originally designed or deployed. Nonetheless, through operations of the maintenance planner 102, the SMP 119 is provided with an ability to download and install all of a requested software product and update(s) in a single transaction, without requiring that the desired software product be installed separately and individually before permitting installation of associated updates to begin. In this way, users of the client system 104 are provided with a unified consumption or installation experience, while easily obtaining a desired, customized installation of a specified software product and associated update(s).

As referenced above, the resulting, customized software and associated update(s) are represented by the media download 114. Meanwhile, the installation file 116 generally represents a file (expressed, e.g., in eXtensible Mark-up Language (XML)) that is generated by the maintenance planner 102 for the purpose of facilitating the actual downloading and installation of the media download 114 at the specific client system 104.

More specifically, as referenced above, the client system 104 may include the software logistics tools 112, some or all of which may be necessary or helpful in downloading and installing the media download 114, based on the installation file 116. For example, in the example of FIG. 1, the software logistics tools 112 are illustrated as including a software provisioning manager 120, which itself includes an installation file reader 122 for reading the installation file 116, and a software download center 124 for executing the actual download and installation of the media download 114.

Further in FIG. 1, the software logistics tools 112 include a software update manager 126. As shown, the software update manager 126 may include an update file reader 128. As implied by their respective names, the software provisioning manager 120 is a software logistics tool that is generally associated with provisioning (e.g., installing) software packages, while the software update manager 126 may potentially be utilized in the context of reading and downloading associated updates for software packages downloaded through the use of the software provisioning manager 120.

Of course, the various software logistics tools 112 illustrated in FIG. 1 should be understood to represent non-limiting examples provided for the sake of explanation and illustration. Various additional or alternative software logistics tools may also be included, as would be apparent. For purposes of understanding operations of the system 100 of FIG. 1, it may be appreciated that the software logistics tools 112 are included to illustrate operations of the maintenance planner 102 in identifying, and selecting from among, any such software logistics tools 112 that may be present at the client system 104 and required for successful installation of the media download 114. As also described, the maintenance planner 102 may rely on interactions of the SLPR 110 in order to select appropriate ones of the software logistics tools 112, and to otherwise provide necessary or helpful information for assisting the client system 104 in downloading the media download 114.

In operation, then, the maintenance planner 102, in conjunction with the SMP 119, may provide a user interface (not specifically illustrated in FIG. 1) through which the user of the client system 104 may provide the installation request 118. More specifically, as referenced above with respect to the SMP 119, the SMP 119 may provide a listing, display, gallery, searchable index, or other forum or setting for allowing the user of the client system 104 to discover and select a desired software product.

For example, as shown, the maintenance planner 102 may include an installation request handler 130 that is configured to provide the user of the client system 104 with a user interface having selectable options for the various software products available in conjunction with the software management system 108. Further, the installation request handler 130 may allow the user of the client system 104 to specify specific, desired upgrades or other updates for the selected software products.

Through the use of such a user interface (or using any other appropriate technique, e.g., including a command line interface or other textual input technique), the user of the client system 104 may easily construct and submit the installation request 118. For example, as described in more detail below, the user of the client system 104 may initially view one or more user interfaces provided by the installation request handler 130, and may determine therefrom that a various number and type of software products and updates are available.

Then, the user of the client system 104 may use the same or different interface to proactively select the various updates from among available updates, so that subsequent installation of the desired software product proceed in conjunction with installation of the desired update. The installation request 118 may similarly be constructed to include various types of data or metadata characterizing the client system 104 and/or characteristics of the desired software installation requested by the user of the client system 104. For example, the installation request 118 may specify a number and type of the software logistics tool 112, an operating system of the client system 104, or other installation-relevant parameters, so that the maintenance planner 102 may consider such factors when providing the media download 114 and the installation file 116.

Other additional or alternative features of the installation request 118 are provided in detail below. For purposes of understanding FIG. 1, it may be appreciated that the installation request 118 includes sufficient information to enable a repository query generator 132 to query the software logistics process repository 110, and thereby discover customized and highly efficient techniques for providing and downloading the media download 114 and the installation file 116.

For example, as referenced above and described in more detail below, the software logistics process repository 110 may be configured to store data relating to one or more software products included within the software management system 108. More specifically, for example, the software logistics process repository 110 may store various mappings between, e.g., each software product, associated upgrades or other updates, associated operating systems or databases that require compatibility with specific versions of the various software products, language information characterizing a language in which the desired software product is written, and one or more software logistics tools that may be necessary or helpful in executing various aspects of the installation request 118. By providing such mappings, the software logistics process repository 110 enables efficient use of the software management system 108, including sufficient interactions with the media repository 106 from which the one or more media files used to instruct the media download 114 are obtained.

In the various types of scenarios referenced above in which the installation request 118 specifies at least one software product and at least one associated upgrade or update thereof, the maintenance planner 102 may include a delta calculator 134 that is configured to process query results obtained by the repository query generator 132, in conjunction with the installation request 118. Specifically, the delta calculator 134 may be configured to calculate a delta, or change/difference, between the underlying, original software product and the requested upgrade or other update thereof, including any intervening, successive, or otherwise related or required updates.

Based on this delta calculation as processed through interactions of the software logistics process repository 110 and based on knowledge of the software management system 108, a media downloader 136 may interface with the media repository 106 to obtain the actual, specific media files to be used in constructing and/or providing the media download 114. In conjunction therewith, an installation file generator 138 may be configured to provide the installation file 116, based, e.g., on the installation request 118, query results obtained from the repository query generator 132, and/or calculated delta results obtained from the delta calculator 134.

In this way, as referenced above and described in more detail below, the installation file generator 138 may provide the installation file 116 for use by appropriate ones of the software logistics tools 112 in executing the requested installation of the media download 114 at the client system 104. For example, the installation file reader 122 of the software provisioning manager 120 may be responsible for reading installation files 116 and instructing the software download center 124 of the software provisioning manager 120 in executing the actual installation of the media download 114 of the client system 104.

When executing the installation and update based on the described installation file 116, the software logistics tools 112 may advantageously use the single, same installation file 116. That is, as described, the installation file 116 may be used to provide both a system identity describing contents of the software product to be downloaded, as well as update requirements, so that the installation file 116 serves as an index for describing what content and installation data will be required, while also allowing for compatibility and consistency checks between the original/current system state and the requested updates.

For example, in FIG. 1, the installation file 116 may be usable by both the software provisioning manager 120, as well as the software update manager 126. For example, the installation file may include a first section describing the start state, and a second section describing the update or target section, based on the calculated delta file obtained from the delta calculator 134.

In the example of FIG. 1, the maintenance planner 102 and the SMP 119 are illustrated as being executed using at least one computing device 140. For example, the at least one computing device 140 may represent, e.g., an application server and/or a web server designed to provide the types of interfaces and other functionalities described herein. Portions of the maintenance planner 102 and/or the SMP 119 may be executed using different computing devices, in communications with one another.

The at least one computing device 140 is illustrated as including at least one processor 142 as well as a non-transitory computer readable storage medium 144. As will be appreciated, the at least one processor 142 may represent one or more processors, perhaps executing in parallel, and implementing instructions stored using the non-transitory computer readable storage medium 144 to thereby provide the various features and functions of the maintenance planner 102, as described herein.

Further in the example of FIG. 1, the maintenance planner 102 is illustrated as including a plurality of separate, individual components or modules 130-138. Of course, in various implementations, the various ones of the components 130-138 may be implemented separately from one another (e.g., on different computing devices/platforms). Further, any single one of the various components 130-138 may be implemented as two or more sub-components, while, conversely, any two or more of the various components 130-138 may be combined for implementation using a single component.

Figure 2:
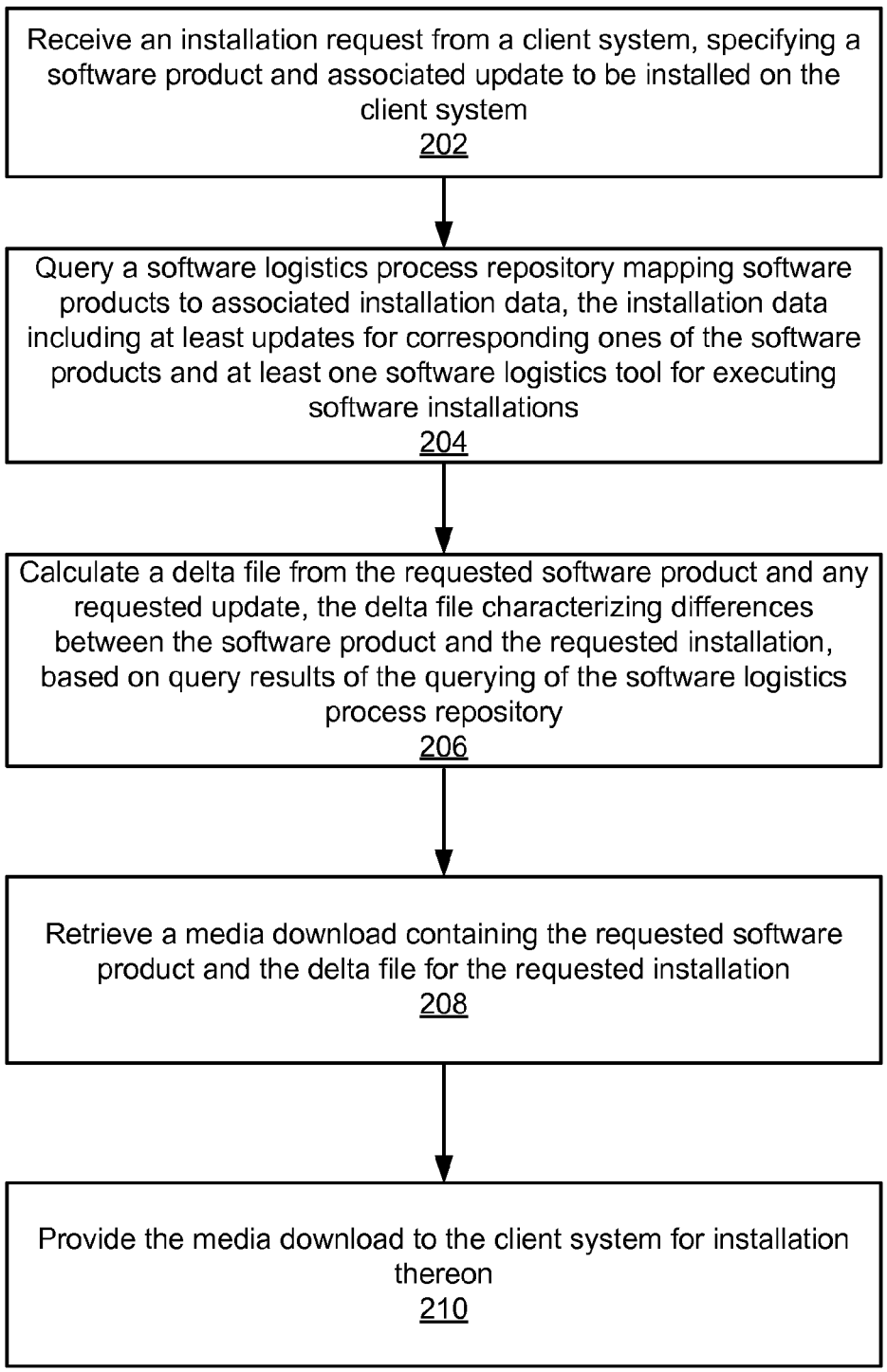
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, in various additional or alternative implementations, one or more additional operations may be included, and/or one or more illustrated operations may be omitted. In all such implementations, any two or more of the various operations, and/or sub-operations thereof, may be executed in a partially or completely overlapping or parallel manner, and/or in a nested, iterative, looped, or branched manner.

In the example of FIG. 2, an installation request may be received from a client system, specifying a software product and associated update to be installed on the client system (202). For example, the installation request handler 130 may receive the installation request 118 from the client system 104. As described, the installation request 118 may specify one or more target upgrades or updates to be installed in conjunction with a requested software product. As also described, the installation request 118 may include various other related parameters, such as a product version of the software product in question, an operating system or other feature or aspect of the client system 104 that may be relevant to operations of the maintenance planner 102, and an identification of one or more software logistics tools 112 implemented using the client system 104.

A software logistics process repository mapping software products to associated installation data may be queried, the installation data including at least updates for corresponding ones of the software products and software logistics tools for executing software installations (204). For example, the repository query generator 132 may construct a query based on a parsing of the installation request 118, and then issue that query against the software logistics process repository 110. In this context, the term installation data should be generally understood to represent or include virtually any type of data that may be useful in installing requested software on the client system 104, including information contained or referenced within the installation request 118, and/or information contained within the query results obtained by the repository query generator 132 (e.g., mapped to the various software products within the SLPR 110). For example, as referenced above, such installation data may include a update(s), software product version(s), or an operating system, database or database management system used by a given software product, or other hardware or software features potentially used by each software product in the context of being installed at the client system 104.

From the requested software product and any requested update, a delta file may be calculated characterizing differences between the software product and the requested installation, based on query results of the querying of the software logistics process repository (206). For example, the delta calculator 134 may be configured to provide such a delta calculation. For example, as described in more detail below, a requested update may specify a particular service pack or other upgrade level. The delta calculator 134 may thus be responsible for determining any predecessor, or otherwise related or relevant, update that may be associated with the specific requested update. For example, in a scenario in which the installation request 118 specifies an update identified as "service pack 8," the delta calculator 134 may determine that the requested update level requires associated updates for service pack 1-6, but not 7 (which may have been rendered obsolete by service pack 8), as well as other features or related updates. In this way, the delta calculator 134 may proceed to calculate the relevant delta between the requested software product, and requested and related software updates, in order to enable downloading of the requested installation.

A media download containing the requested software product and the delta file for the requested installation may be retrieved (208). The media download may thus be provided to the client system for installation thereon (210). For example, the media downloader 136 may access the media repository 106, based on query results from the repository query generator 132, delta calculation results from the delta calculator 134, and based on the installation request 118, to thereby obtain a media download including specific media files from the media repository 106, perhaps in conjunction with an identification and specification of such media files as provided by the software management system 108 and/or the software logistics processor repository 110.

Figure 3:
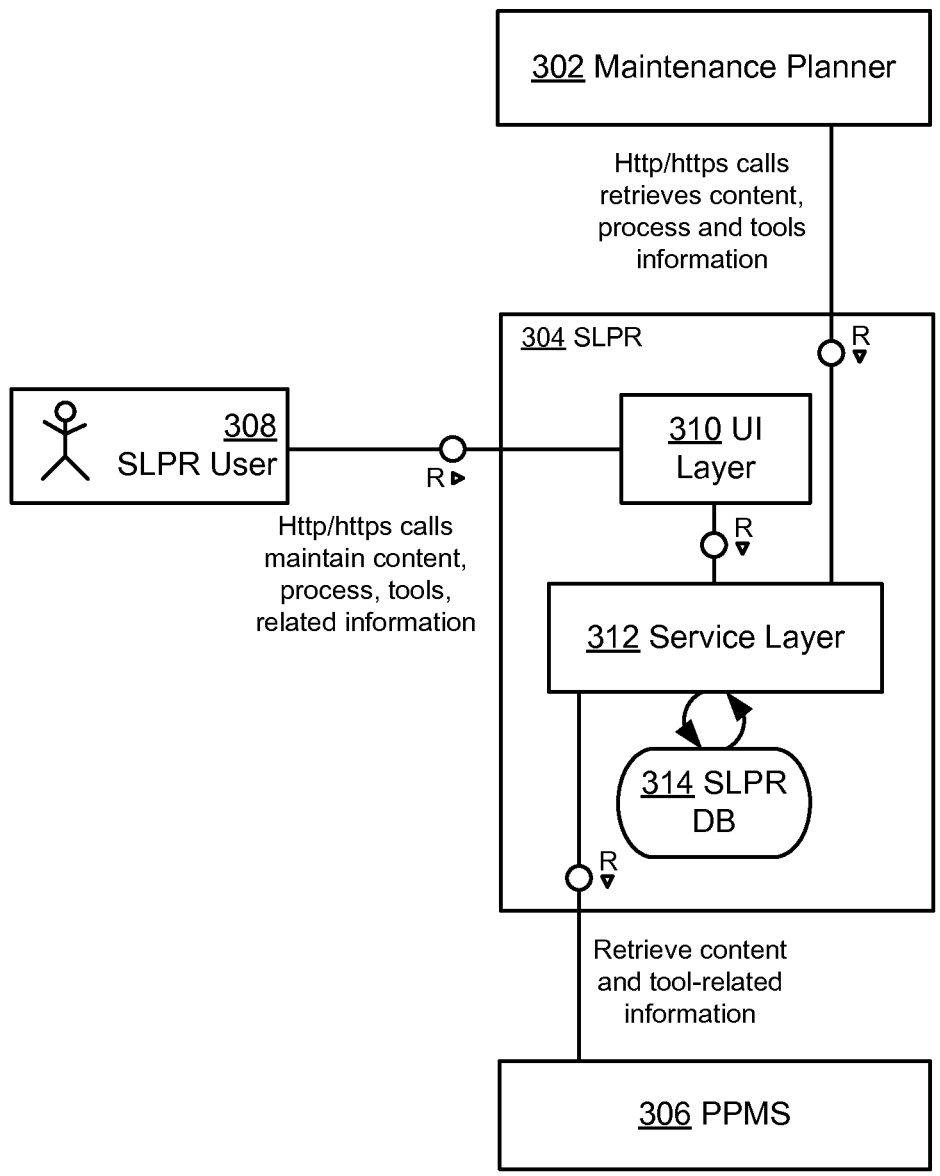
FIG. 3 is a block diagram of an example of a software logistics process repository of the system of FIG. 1.

FIG. 3 is a block diagram illustrating a more detailed example implementation of the software logistics process repository 110 of FIG. 1. In the example of FIG. 3, a maintenance planner 302 represents an instance of the maintenance planner 102 of FIG. 1, while a software logistics processor repository 304 illustrates an instance of the software logistics process repository 110 of FIG. 1. Similarly, a product and production management system (PPMS) 306 represents an instance of the software management system 108 of FIG. 1. In the example of FIG. 3, and in various examples provided below, some of the illustrated components are described with respect to specific implementations of software management and installation systems provided by SAP SE of Waldorf, Germany. However, of course, it will be appreciated that all such examples, and any examples provided herein, are intended merely as non-limiting examples provided for the sake of explanation of the concepts described above with respect to FIGS. 1 and 2, and related concepts.

As described herein, the software logistics process repository 304 may be utilized for a variety of different purposes, including fast and efficient download and installation of desired software. As described, specific examples are provided with respect to software installation scenarios, in which the software logistics process repository 304, in conjunction with the maintenance planner 302, reduces or eliminates a need for a user of a client system to undertake such activities as researching various software guides to identify and download a desired set of media files, finding and downloading (current versions of) associated software logistics tool(s), or otherwise locating and using necessary resources to complete a desired software installation.

In so doing, the software logistics process repository 304 provides, in machine-readable format and through (in some example implementations) a single interface machine-readable information, which contains necessary download information for completing the requested installation. Specifically, as described herein, the software logistics process repository 304 may contain installation data including metadata/attributes such as relevant databases, operating systems, or languages used, with respect to underlying DVD files or other media files of the media repository 106. The software logistics process repository 304 also provides mappings between such software logistics tools and processes such as installations or updates. Further, the installation data a particular software product and associated update(s) may be utilized for generation of the installation file 116 (not shown separately in FIG. 3).

In the example of FIG. 3, a SLPR user 308 represents one or more persons authorized to maintain or otherwise manage data within the software logistics process repository 304, along with any associated maintenance and administration thereof. As shown, the SLPR user 308 may utilize any appropriate technique(s), including an http (hypertext transfer protocol) and https (secure http) call to the software logistics process repository 304, to thereby maintain content, execute processes, utilize tools, and otherwise benefit from the software logistics repository 304.

Further in FIG. 3, the software logistics process repository 304 is illustrated as having three sub-components 310-314. In the example of FIG. 3, as shown, a UI layer 310 provides a front end for the SLPR user 308 to maintain and otherwise interact with data in the software logistics process repository 304. As may be appreciated, the UI layer 310 facilitates the actions of the SLPR user 308. Thus, the SLPR user 308 generally represents various persons or categories of persons involved in providing and maintaining data within the SLPR 304, and who are responsible for the administration of the SLPR 304. Various examples of classes of the SLPR user 308 are provided below.

Meanwhile, a service layer 312 may be configured to process requests by way of the UI layer 310, and/or directly from the maintenance planner 302, to thereby maintain and otherwise utilize data stored within the SLPR database 314. The SLPR database 314 represents the component containing the various types of mapping data described herein for mapping various software products, associated updates, and other installation data. More detailed examples for the type of database table structures and relationships that might be used to implement the SLPR database 314 are provided below, or would be apparent.

The service layer 312 provides services for the otherwise-standard "create read, update, and delete" (CRUD) operations with respect to the SLPR database 314. As illustrated, the service layer 312 may be configured to interact with the PPMS 306, e.g., to get details of a specified product version and relevant software logistics tools, based on the mappings of the SLPR DB 314. The service layer 312 also may provide services to a service layer of the maintenance planner 302, as illustrated and described below with respect to FIG. 4. For example, services provided to such a service layer of the maintenance planner 302 may be associated with obtaining details regarding media content.

The UI layer 310 provides a front end for the SLPR user 308 to maintain data with the SLPR 304. A separate administration console for administration-related activities for the SLPR 304 may be provided. In conjunction with the service layer 312, the UI layer 310 may be configured to provide a desired type and level of authentication and authorization with respect to the SLPR user 308.

In example implementations, a data model used by the SLPR 304 may be implemented in scenarios in which the SLPR 304 is constructed as an extension to the PPMS 306. In such examples, the SLPR 304 may relate to at least the four following components.

For example, the data model used by the SLPR 304 may include a product version, for which meta information about a given process is maintained. Another component may include content components, which may refer to any information linked to a product version within the PPMS 306. A defined content structure may include a combination of more than one entity in the PPMS 306. For example, a particular download required by the software update manager 126 for upgrades/updates scenarios may include multiple software components. A process component may refer to software logistic processes, such as, e.g., update, upgrade, installation, or configuration. Finally, software logistic tools, such as the software logistics tools 112 of FIG. 1, refer generally to tools required for a given process execution, such as the specific examples of software logistic tools 112 provided with respect to FIG. 1. In FIG. 3, the SLPR 304 may be configured to maintain relationships between the above-referenced metadata, to provide support for various use cases (e.g., installation, or update), and to provide a single interface to assist the SLPR user 308, as well as to assist users of the client system 104. Thus, the SLPR 304 provides a structure in which process, content, and software tools are mapped against each other for a given software product, including mapping of a media set of the software product and associated software logistics tools for installing the software product and associated upgrades/updates.

In more specific examples, the SLPR data model may include content in the form of DVD or bill of materials, where such content and associated SL tools are stored as an abstract entity that may be referred to as an object. Then, a relation between such an object and an associated type of software logistics process in which the object was used may also be stored. The association of the object with the product version may also be stored.

In example scenarios, such as scenarios in which the stored object includes a DVD, the DVD may be associated with a kit-ID stored in the SLPR 304. The DVD in such scenarios may be described using attributes related to its kit-ID, such as a product version associated with the DVD, or a labeling of the kit as being an enhancement package (where such labeling may be used in calculating the installation file 116). Further, production instances shipped with the kit and alternative software component versions related to such product instances may be stored. Related information for a particular component/object/product version may also be stored.

Example table names for tables created to implement the SLPR database 314 are provided below in table 1:

| Table Name | Table Description |
|---|---|
| SLPR_OBJ | Stores data related to all objects content/tool/DVD). |
| SLPR_PROC_TYPE | Lookup table. Stores the entries for different types of SL processes; for example, Installation. |
| SLPR_OBJ_PROC | Associates the SL process with the object. Also demarcates the type of object (CONTENT/TOOL). |
| SLPR_OBJ_PRDV | Associates an object with the product version |
| SLPR_DVD_DESC | Describes the DVD using its kit id. |

-continued

| Table Name | Table Description |
| --- | --- |
| SLPR_KIT_INST | Stores the data related to the product instances shipped in this kit |
| SLPR_ALT_SCV | Stores the data related to the alternative software component versions for a product instance |
| SLPR_OBJ_DO | Stores the actual downloadable objects' references. In case of an initial installation media, this would contain entries, e.g., for installation master or kernel |
| SLPR_ATTR | Stores the attributes which help in filtering the objects' components, based on criteria like DB or OS. |
| SLPR_DO_ATTR | Stores the mapping between the downloadable objects and their associated filter criteria. |
| SLPR_OBJ_INFO | Stores the related information for the content/tools. This information could be in the form of notes, guides or help links. |

As referenced, the SLPR user 308 may represent various types of users. For example, such users may include an SLPR development team, which develops and maintains the entire SLPR 304, and interacts with its consumers. Maintenance in this regard may include, e.g., handling any messages which request the creation of new objects in the SLPR 304, maintaining user authorizations, and/or maintaining data replication mechanisms.

Another type of SLPR user 308 includes the assembly project lead (APL). The APL may be responsible for assembling media sets that are shipped to the customers through the SMP 119 for a particular product version.

A product team refers to a team that uses capabilities of the SLPR 304 for an improved consumption of its software product by the customer. The product team would thus be responsible for getting details of the contents of the initial media to the APL. Further, information about the related information may also be provided to the APL by the product team.

In a final example, software logistics teams, e.g., represented by the software product owner, may refer to teams that own the SL tools, and that would be involved in maintaining the SL tools data into the SLPR 304. The SL teams would also be responsible for mapping the SL tools data to corresponding SL processes.

Figure 4:
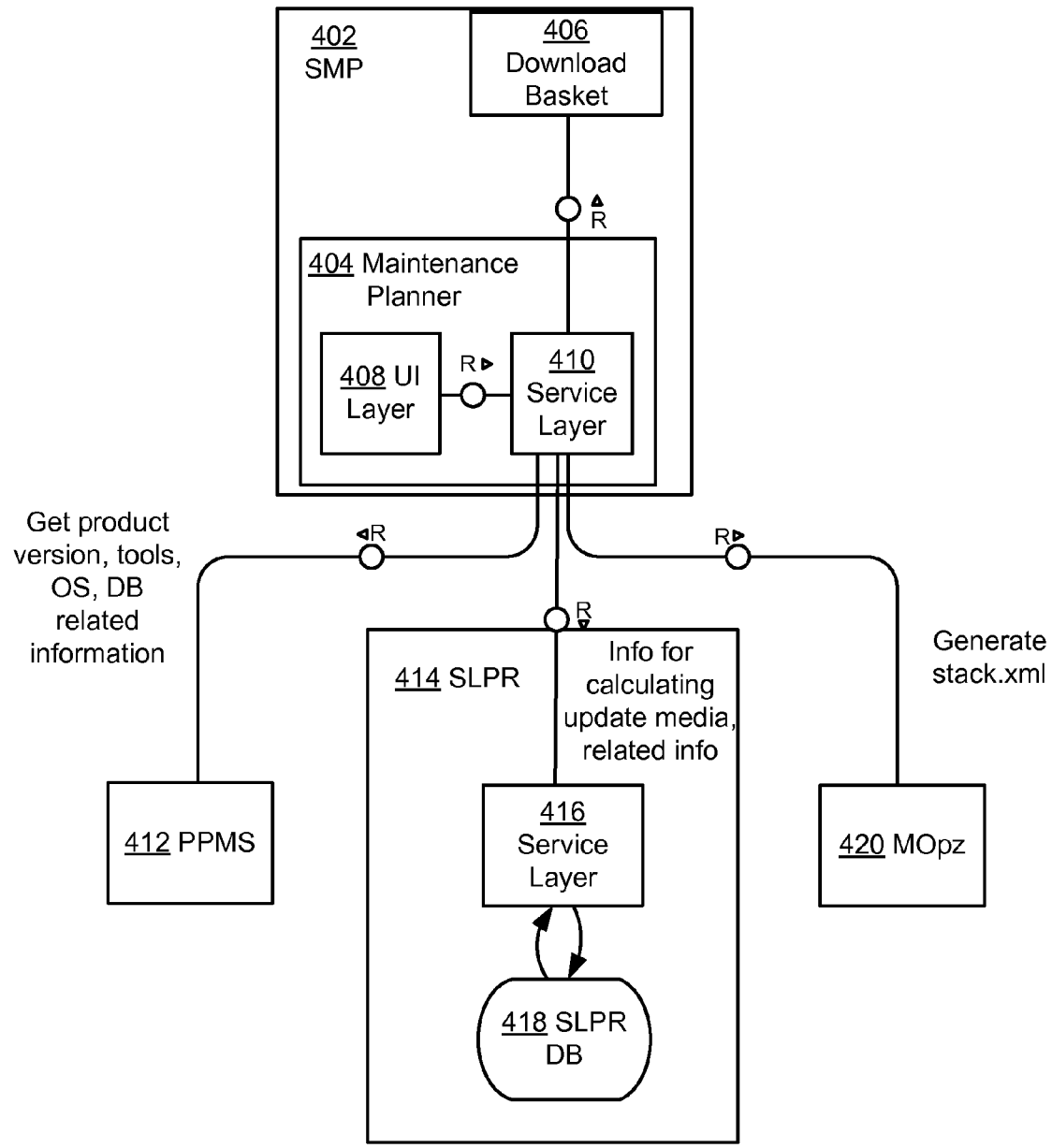
FIG. 4 is a block diagram of an example of a maintenance planner of the system of FIG. 1.

FIG. 4 provides more detailed example implementations of the system 100 of FIG. 1, using the system 300 and SLPR 304 of FIG. 3. In the example of FIG. 4, as described above with respect to FIG. 1, it is assumed that a customer, e.g., a user of the client system 104, wishes to trigger a fresh installation for a specific software product, including desired updates (such as updates for the software product with a most current stack level.

In conventional systems and scenarios, as referenced above, in order to do a fresh installation of the software product in this context, a user of the client system may encounter various complexities and inconveniences. For example, such a user may be required to review various guides in order to download a correct and desired set of media files. The user may also have to find and download the latest software logistics tools required for installation/update. The user would ultimately have to provide or obtain the correct set of media files.

In more detail, in such conventional scenarios, the user might typically be required to utilize conventional versions of the SMP 119 to choose a current product version, associated operating system and database system, associated media files, and a latest version of the software logistics tools, such as the software provisioning manager 120. At this point, the user might be required to install the initial system based on downloaded media files. In order to execute the second, separate update step, the user might conventionally have been required to register the downloaded software product with a centralized solution manager, to thereby enable the solution manager or other appropriate component to calculate and upgrade the update file, sometimes referred to as a stack.xml file. Then, the software update manager 126 might be used to update the client system 104 with delta files showing differences between the already-installed software product and specified software update.

In contrast, in FIG. 4, an example SMP 402 is illustrated as including a maintenance planner 404, which is associated with a download basket 406. As shown, the maintenance planner 404 may include a UI layer 408 and a service layer 410. As also shown, the service layer 410 may be in communication with an instance of the PPMS 412. Then, through the use of an instance of the SLPR 414, the service layer 416 and SLPR database 418 may be accessed to obtain information, in machine-readable form, related to details for desired media files, tools, language files, and/or related documentation.

In the example of FIG. 4, the SMP 402 illustrates and example of the SMP 119 of FIG. 1, which provides a placeholder or starting point for customer interactions in obtaining desired software products. For example, a link may be provided to launch the maintenance planner 404, e.g., as a web application to assist the user of the client system 104 in executing desired installations.

The maintenance planner 404 may be implemented as a web application providing a road map in a guided manner for assisting and executing the specified installation. For example, the user of the client system may initially execute a selection phase in which the user selects a product version to be installed based on appropriate criteria, such as, for example, a specific operating system, database, operating system bit type, product instance, language, kernel type, release data or other status data, and/or target service pack (or other type of update). For example, values for these categories may be obtained from corresponding product version entries from the PPMS 412 (e.g., a bill of material (BOM)), based on the types of parameters just referenced. Then, the initial media and associated, relevant software logistics tools, as well as any associated guides and notes, may be populated within the SLPR 414. In practice, update media and, e.g., an associated stack.xml file or other update file, may be retrieved for a specified target SP stack, using, for example, a backend service such as the Maintenance Optimizer (MOpz) service of SAP SE. Then, all necessary media files, guides, tools, and notes may be added to the download basket 406 for the user.

The service layer 410 of the maintenance planner 404 is configured to obtain relevant information provided for the PPMS 412, the SLPR 414, and a delta calculation service, such as the MOpz backend service 420. In the latter regard, the MOpz 420 may provide an example of a delta calculation service. The delta calculation service may be used to generate the stack.xml file (e.g., the installation file 116), which is required, in the example, to install the requested software and also update the system to specified target service packs. Based on the specified stack.xml file, the list of media files/archives needed for the installation and update may be calculated.

Figure 5:
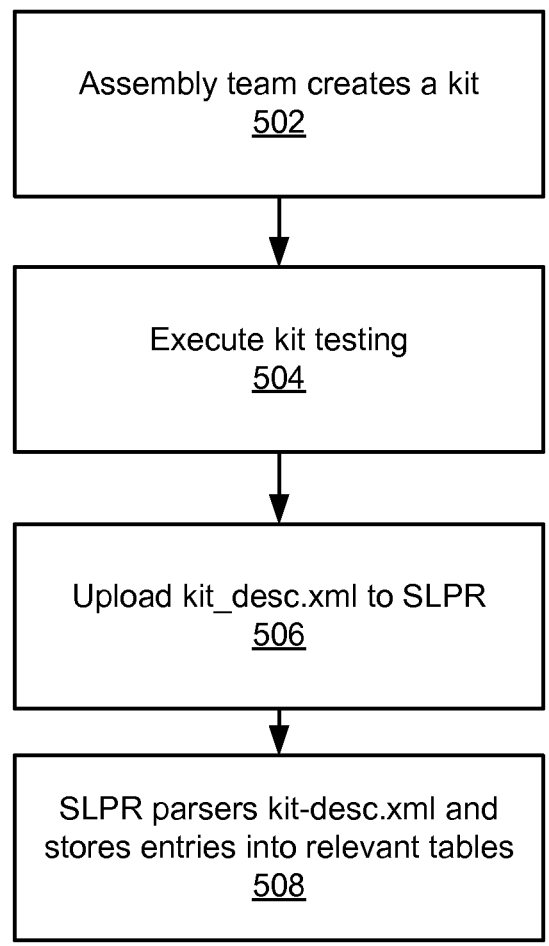
FIG. 5 is a flowchart illustrating more detailed example operations related to updating the software logistics process repository of FIGS. 1 and 3.

FIG. 5 is a flowchart 500 illustrating more detailed example operations of the systems and methods of FIGS. 1-4, with respect to techniques for storing data within the SLPR 110/304/414. In the example of FIG. 5, an assembly team for a new or existing software product may be responsible for creating an applicable kit (502), where a kit, as referenced above, may be defined, e.g., for each product version, (kernel for) specific OS and DB options, software logistics tools, and language combination(s).

Testing of the kit may be executed (504), and a description for a tested kit, e.g. as a description kit_desc.xml file, may be uploaded to the SLPR (506). Finally in FIG. 5, the SLPR may parse the kit_desc.xml file and store entries for the various parameters referenced above, e.g., a product version ID, OS, DB, and other installation data into relevant tables of the SLPR.

Figure 6:
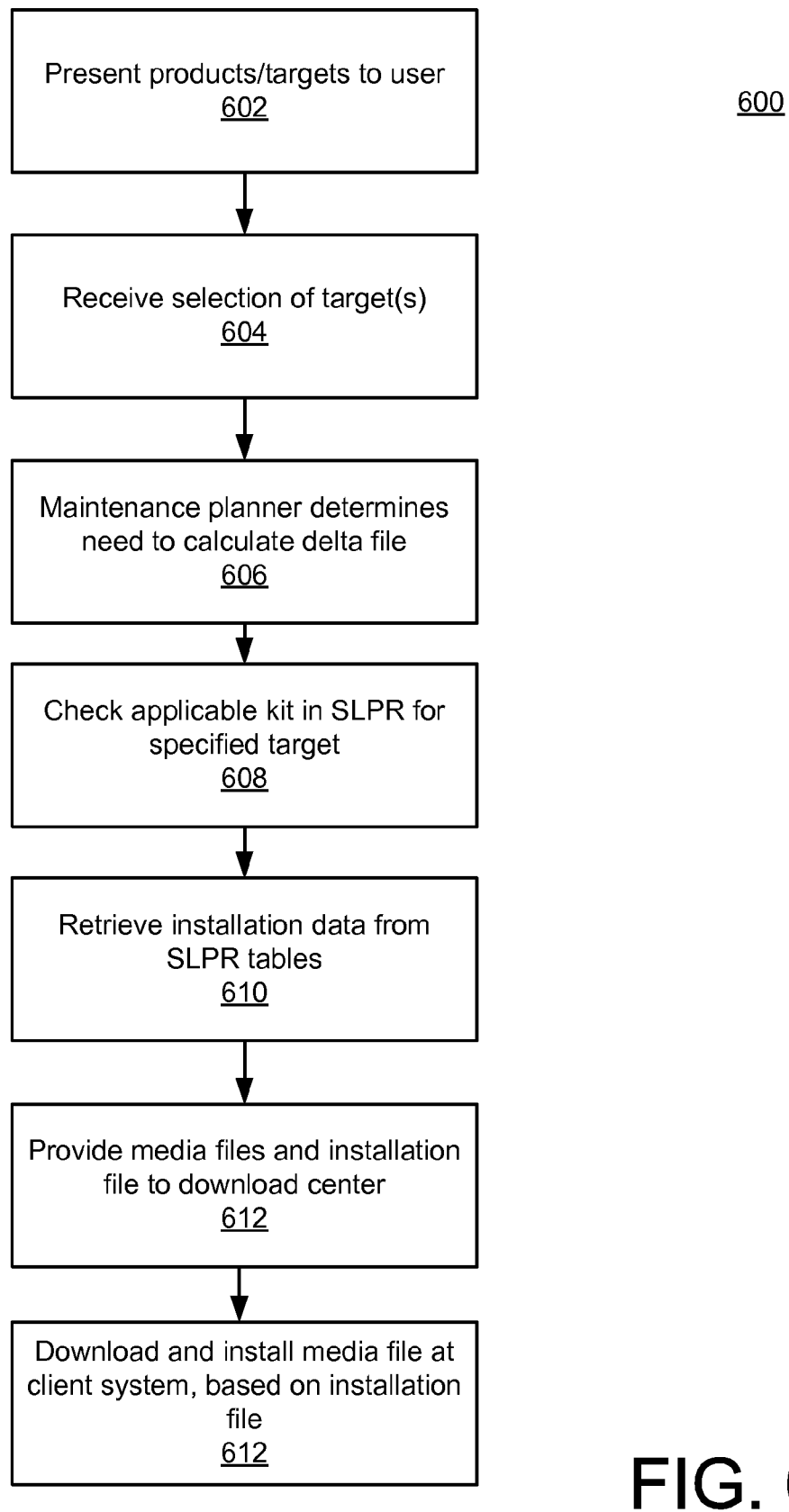
FIG. 6 is a flowchart illustrating more detailed example operations related to accessing the software logistics process repository of FIGS. 1 and 3.

FIG. 6 is a flowchart 600 illustrating more detailed example operations of the systems and methods of FIGS. 1-5, with respect to data retrieval from the SLPR. For example, in the context of the SMP 119/402, FIG. 6 illustrates examples in which software products and associated, potential update targets are presented to the user (602). In order to do so, the maintenance planner 102/420 may initial retrieve available targets from the SLPR 110/304/414. As described, the SLPR 110/304/420 may provide a selection of associated updates (e.g., support package stack(s)), beginning with what is present in the requested download. For example, if the requested software product version is requested with a support stack target level of 6, then support stacks at level 6 and above may be provided.

After presenting potential software products and associated upgrades/update targets to the user, the user's installation request, including specified target level, may be received (604). The maintenance planner 402 may obtain the target product version ID, operating system, database, and any other requested installation data, and notify the MOpz 420 that a delta calculation will be required.

The maintenance planner 102/404 may then check for an available, applicable kit in the SLPR 404 for the specified target installation (608). The appropriate installation data may be retrieved from corresponding SLPR tables (610). Thus, the SLPR provides sufficient information to define a start state for the installation, while the target received from the user defines the target state, which enables the type of automatic delta calculations described herein.

The desired media files, and the associated installation file, may be passed directly to a software download center (612). Finally in FIG. 6, the software download center may proceed to install the requested media files (for the requested software product and any required targets) at the client system, using the associated installation file (614).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A computer-implemented method for executing instructions stored on a non-transitory computer readable storage medium, the method comprising:
receiving at a maintenance planner an installation request for installation of a software product and associated update on a client system;

providing a media download in a single transaction, the media download including a software product file, a delta file, and an installation file for installation of the requested software product and associated update on the client system, the delta file describing differences between the software product, and the associated update, the installation file characterizing both the software product file and the delta file;

parsing the installation request to identify the software product, the associated update, any other installation data included therein, and an aspect of the client system;

querying a software logistics process repository mapping software products to corresponding installation data, the querying based in part on the aspect of the client system, to obtain query results based on the installation data included in the installation request;

calculating the delta file, based on the installation request and the query results; and generating the installation file, based on the installation request, the delta file, and the query results, providing the media download to a software logistics tool configured to read the installation file and install the software product and associated update on the client system using the installation file in response to execution, on the client system, of a selection phase in which a user selects a product version to be installed based on at least two criteria from a specific operating system, an operating system bit type, a kernel type, and a release date of the product version.

2. The method of claim 1, wherein the delta file describes differences between the software product, the associated update, and any additional update used to satisfy the requested installation.

3. The method of claim 1, further comprising generating an installation file based on the installation request, the delta file, and query results obtained from the querying, the query results based on installation data specified in the installation request, wherein the installation file characterizes both the software product and the delta file.

4. The method of claim 3, wherein the installation file is readable by the at least one software logistics tool.

5. A system including instructions recorded on a non-transitory computer-readable storage medium, and executable by at least one hardware processor, the system comprising:

a maintenance planner executed by the at least one hardware processor to receive an installation request for installation of a software product and associated update on a client system, and further executed by the at least one hardware processor to provide a media download in a single transaction, the media download including a software product file, a delta file, and an installation file for installation of the requested software product and associated update on the client system, the delta file describing differences between the software product, and the associated update, the installation file characterizing both the software product file and the delta file, the maintenance planner including:

an installation request handler executed by the at least one hardware processor to receive the installation request and parse the installation request to identify the software product, the associated update, any other installation data included therein, and an aspect of the client system;

a repository query generator executed by the at least one hardware processor to query a software logistics process repository mapping software products to corresponding installation data, the query based in part on the aspect of the client system, to obtain query results based on the installation data included in the installation request;

a delta calculator executed by the at least one hardware processor to calculate the delta file, based on the installation request and the query results; and an installation file generator executed by the at least one hardware processor to generate the installation file, based on the installation request, the delta file, and the query results, wherein the maintenance planner is executed by the at least one hardware processor to provide the media download to a software logistics tool executed by the at least one hardware processor to read the installation file and install the software product and associated update on the client system using the installation file in response to execution, on the client system, of a selection phase in which a user selects a product version to be installed based on at least two criteria from a specific operating system, an operating system bit type, a kernel type, and release date of the product version.

6. The system of claim 5, wherein the maintenance planner is provided in the context of a service marketplace providing a user interface for selection among a plurality of software products.

7. The system of claim 5, wherein the software product is not installed on the client system at the time of the installation request.

8. The system of claim 5, wherein the installation data mapped within the software logistics process repository includes at least one software logistics tool available to the client system for use in reading the installation file and installing the media download.

9. The system of claim 8, wherein at least two of the at least one software logistics tools are configured to read the installation file.

10. The system of claim 5, wherein the installation data specified in the installation request includes the aspect of the client system including a specification of an operating system of the client system and a language of the client system.

11. The system of claim 5, wherein the installation data specified in the installation request includes a product version of the software product.

12. The system of claim 5, wherein the software logistics process repository is implemented in conjunction with a software management system storing available software products, including the requested software product, using associated media files in a media repository.

13. A computer program product, the computer program product being tangibly embodied on a non-transitory computer-readable storage medium and comprising instructions that, when executed, are configured to cause at least one computing device to:

receive at a maintenance planner an installation request for installation of a software product and associated update on a client system;

provide a media download in a single transaction, the media download including a software product file, a delta file, and an installation file for installation of the requested software product and associated update on the client system, the delta file describing differences between the software product, and the associated update, the installation file characterizing both the software product file and the delta file;

parse the installation request to identify the software product, the associated update, any other installation data included therein, and an aspect of the client system;

query a software logistics process repository mapping software products to corresponding installation data, the query based in part on the aspect of the client system, to obtain query results based on the installation data included in the installation request;

calculate the delta file, based on the installation request and the query results; and generate the installation file, based on the installation request, the delta file, and the query results, provide the media download to a software logistics tool configured to read the installation file and install the software product and associated update on the client system using the installation file in response to execution, on the client system, of a selection phase in which a user selects a product version to be installed based on at least two criteria from a specific operating system, an operating system bit type, a kernel type, and a release date of the product version.

14. The computer program product of claim 13, wherein the delta file describes differences between the software product, the associated update, and any additional update used to satisfy the requested installation.

15. The computer program product of claim 13, wherein the instructions, when executed, are further configured to generate an installation file based on the installation request, the delta file, and the query results obtained from the querying, the query results based on installation data specified in the installation request, wherein the installation file characterizes both the software product and the delta file.

16. The computer program product of claim 15, wherein the installation file is readable by the at least one software logistics tool.

17. The computer program product of claim 15, wherein the instructions, when executed, are further configured to download the media download and the installation file to the client system, for installation thereon using the at least one software logistics tool identified using the query results and configured to read the installation file.

18. The computer program product of claim 13, wherein the software product is not installed on the client system at the time of the installation request.

19. The computer program product of claim 13, wherein the installation data includes a specification of an operating system of the client system, a language of the client system, and a product version of the software product.

* * * * *